3,051,993
**PROCESS FOR PRODUCING POROUS POLY-
ETHYLENE ARTICLES**
Conrad Goldman, Buffalo, N.Y., and Robert Rosenbaum, Morris Plains, N.J., assignors to Allied Chemical Corporation, New York, N.Y., a corporation of New York
Filed Aug. 16, 1960, Ser. No. 49,834
3 Claims. (Cl. 18—55)

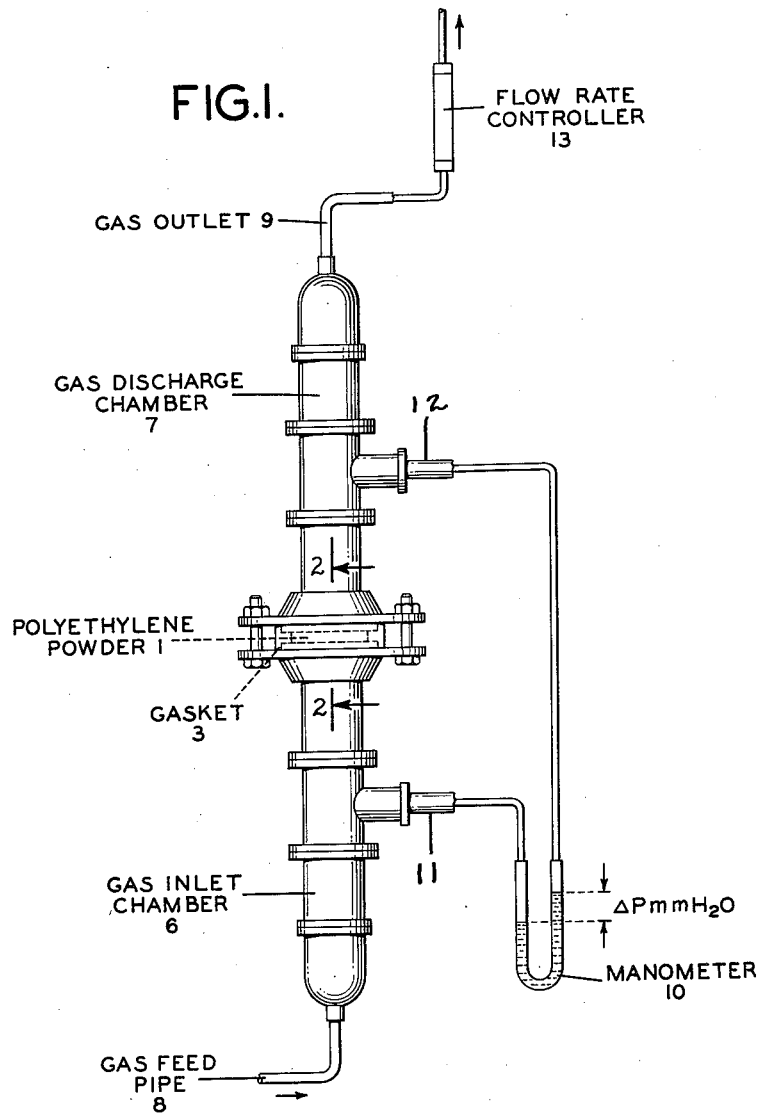

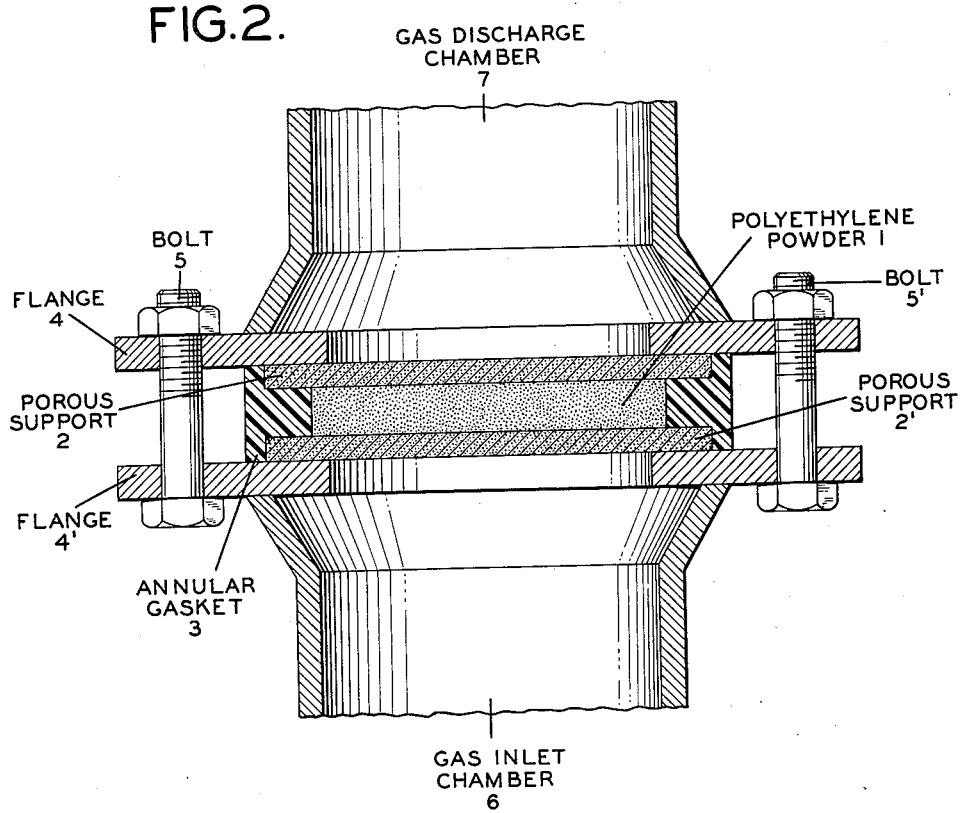

This invention relates to porous polyethylene products, and more particularly to a process for preparing porous polyethylene sheets and shapes of high porosity and strength characteristics.

It is known to prepare porous sheet materials by subjecting granular or particulate thermoplastic resinous material to the action of heat to cause partial agglomeration of the particles and formation of a cohesive porous sheet.

Such porous sheets have been found useful in the preparation of battery separators, gas filters, acoustical barriers, fabric coatings and the like. Porous articles of this type usually must have high porosity values, usually at least about 40% of intercommunicating voids, preferably between about 45% and about 60% or higher.

Porous articles of the above and other types prepared from powdered polyethylenes have produced sheets which in general are quite dense and possess low degrees of porosity. Attempts to prepare porous polyethylene compositions of high porosity, have resulted in products of flimsy character and unacceptably low strength characteristics.

It is a primary object of the present invention to provide a process for preparing polyethylene sheets of high porosity, coupled with high strength characteristics.

Another object of the invention is to provide porous polyethylene products of high porosity and high strength characteristics.

These and other objects are accomplished according to our invention wherein a mass, i.e. a layer or shape of a high density, high molecular weight polyethylene in solid powdered form having particle size such that the major portion of the particles pass a 40 mesh U.S. screen and are retained on a 200 mesh U.S. screen, is subjected, while confined within a porous support, to temperatures between about 300° F. and about 500° F., preferably between about 300° F. and about 450° F., while concomitantly passing a stream of hot inert gas through the supported powdered polyethylene for a time sufficient to cause "sintering" and adhesion of the polyethylene particles without complete fusion, and thereafter cooling the resultant cohesive, porous product.

In the drawings, FIGURE 1 represents schematically an apparatus suitable for carrying out the process of our invention, FIGURE 2 represents a section taken along line 2—2 of FIGURE 1.

In the figures, numeral 1 represents a layer of polyethylene powder, confined between upper and lower porous supports 2 and 2′, respectively, and annular gasket 3, the assembly being secured by a pair of annular flanges 4 and 4′ secured together by bolts 5 and 5′. The thus sandwiched layer of polyethylene powder and its supports is positioned over a gas inlet chamber 6 having a gas feed pipe 8 connected to a source of inert gas (not shown). Above the supported sandwich is gas discharge chamber 7 connected to gas outlet pipe 9 and flow rate controller 13. A manometer 10 is connected to gas inlet chamber 6 through pipe 11 and to gas discharge chamber 7 through pipe 12 and records pressure differential between the two chambers.

In carying out the process according to our invention, the polyethylene powder is placed into or between sheets or shapes of suitable porous supporting material which may be cloth, filter paper, porous metal or the like, which will permit ready passage of the inert gas therethrough, and which is strong enough not to be unduly disrupted by the force of the gas stream. The powder may be compacted if desired or leveled or molded to the desired thickness or shape by any suitable conventional means. The polyethylene and its porous support are placed in an oven which may be either preheated to the sintering temperature or may subsequently be heated to the desired level. The support will preferably be secured in gas-tight connection over the mouth of a gas inlet. Inert gas such as nitrogen, carbon dioxide, etc., preferably preheated to sintering temperature, is passed through support and powdered polyethylene mass at a suitable rate to achieve the desired porosity. The support may consist of two flat porous supports, one above and one below the powdered polyethylene mass, with non-porous vertical supports as when sheets are being prepared, or it may consist of a porous shaped mold as in the case of other shapes, or any other convenient supporting device.

In order to hasten the sintering process, we may spray the powdered polyethylene with a liquid swelling agent or solvating agent for the polyethylene prior to sintering, or we may pass solvating agent vapor through the polyethylene layer prior to passage of the inert gas or in conjunction therewith. Suitable solvating agents are the liquid hydrocarbons and chlorinated hydrocarbons having boiling points of at least about 110° C. Such solvating agents act at elevated temperature to swell and solvate the polyethylene and to lower the normal fusion point (ca. 275° F.) of the powdered polyethylene. Suitable solvating agents of the above character include toluene, xylene, decalin (tetrahydronaphthalene), tetrachloroethylene, etc. These may be vaporized if desired and passed through the pulverulent polyethylene mass together with the inert gas. Alternatively, reactive gases of any desired character may be mixed with the inert gas and passed through the pulverulent polyethylene to simultaneously sinter and modify the chemical and/or structural characteristics of the resulting sintered product, for example, butadiene, etc.

If continuous operation is desired, polyethylene powder mass may be confined within the porous support on a moving conveyor belt, leveled as with a doctor blade, or formed to the desired shape, and the belt passed into a gas-tight heated chamber over the inert gas inlet at a rate sufficient to supply the required residence time at the temperature and gas flow conditions, to achieve the desired results.

The polyethylene materials which are suitable for use in our invention, are the normally solid, high molecular weight, high density polyethylenes, prepared as described in co-pending applications Serial No. 597,900 and Serial No. 654,602 by at least intermittently contacting anhydrous, oxygen-free ethylene in gaseous phase with an inorganic, porous, frangible, solid contact catalyst prepared from an inorganic compound of chromium and oxygen and an active metal alkyl as described in said applications. Especially preferred are the polyethylene products prepared as described in detail in co-pending application Serial No. 654,602 filed April 23, 1957. These polyethylenes have essentially the empirical formula $(CH_2)_x$ and have molecular weights, calculated from viscosities in decalin solution at 135° C. by the P. S. Francis et al. formula, in the range between about 1,000,000 and about 5,000,000. They have densities in the range between about 0.935 and about 0.985, usually between about 0.935 and about 0.960, at 23° C. (ASTM Method D 792).

The molecular structure of these polyethylenes is unique, giving rise to exceptional values for certain physical properties including toughness and strength.

In their structure, these polyethylenes exhibit an absence of measurable methyl group bands in the infrared absorption spectrum; for example, they have infrared absorption spectra with specific absorption coefficient at 7.25 microns of about 8.2 cm.$^{-1}$. They have relative absorptions at 11 microns (terminal vinyl (—CH=CH$_2$) double bonds), 10.37 microns (trans internal RCH=HCR) and 11.27 microns (vinylidine

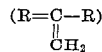

double bonds), indicating that at least 80% of the polymer double bonds are of the terminal vinyl type, and that these terminal vinyl groups are present in the range of about 0.2 to about 2 per thousand carbon atoms. These concentrations are exceptionally high in view of the molecular weights of the polyethylenes, these concentrations being in the range normal for polyethylenes having about one tenth the molecular weights of these polyethylenes. Absorption at 5.28 microns indicates that these polyethylenes are about 75%–80% crystalline. Such polyethylenes are only exceedingly sparingly soluble in the common organic solvent liquids, even at elevated temperatures above their softening points, such solubilities in general amounting to only a fraction of a percent, of the order of about 0.1% or less at 135° C. However, a number of organic liquids act as swelling or solvating agents at elevated temperatures, as brought out above, and thus lend themselves to employment, especially in vapor form, in conjunction with the inert gas treatment of our invention.

A typical high molecular weight polyethylene of the character utilized in our invention has the physical properties listed in Table I below.

TABLE I
Polyethylene

| Property | Typical values | Method |
|---|---|---|
| Molecular weight | 1,000,000–3,000,000 | P. S. Francis et al.[1] |
| Amorphous content, percent | 14–23 | X-ray and IR. |
| Linearity (CH$_3$/200 C atoms) | 0.2 | IR. |
| Melting point, °C | 133 to 137 | Disappearance of double refraction. |
| Relative viscosity (0.125% conc.) | 3.5 to 6.5 | [2]. |
| Log$_{10}$ melt viscosity (centipoises at 190° C.) | 11 to 12 | [3]. |
| Density, g./cc. at 23° | 0.935 to 0.960 | ASTM D 792. |
| Stiffness modulus (p.s.i.) | 86,500 to 94,500 | ASTM D 747. |
| Elastic modulus "E" (0.05") (p.s.i.)[4] | 62,400 | ASTM D 638. |
| Tear strength (20"/min) (p.s.i.) | 1,100 | ASTM D 1004. |
| Impact strength (ft. lbs./in. notch) | 22.2 | ASTM D 256. |
| Rockwell hardness | R 48 | ASTM D 785. |
| Heat distortion temp, °C | 66 | ASTM D 648. |
| Tensile strength (p.s.i.) | 4,800 | ASTM D 412. |
| Elongation at break, percent | 475 | ASTM D 412. |
| Yield strength (p.s.i.) | 3,500 | ASTM D 412. |

[1] From viscosity of a 0.05 to 0.1 gram per 100 cc. solution in decalin using equation $n=6.77 \times 10^{-4} M^{0.67}$ where $n$=intrinsic viscosity; $M$=weight average molecular weight, as described in paper presented before Division of Polymer Chemistry at 130th meeting of American Chemical Society, September 19, 1956. Published in J. Polymer Science 31, 453–466 September 1958.
[2] Value calculated for a 0.125% solution in decalin at 135° C.
[3] Value calculated by extrapolation of melt index data. (D 1238.)
[4] Using specimen type C of D–412.

The particle size of the polyethylene used may vary widely within the limits indicated. Under otherwise similar conditions, presence of a large proportion of large size particles produces the higher porosity sheets having somewhat lower strength, whereas the presence of a substantial proportion of small size particles, particularly fines, produce sheets of exceptionally high strength and only slightly lower porosity.

We prefer, therefore, to employ polyethylene powders having an appreciable percentage of fines, for example, at least about 50%, preferably having between about 50% and about 75% of particles which pass through a standard 100 mesh U.S. screen.

A typical screen analysis of a suitable polyethylene powder using standard U.S. screens is given in Table II below.

TABLE II
Screen Analysis of Typical Polyethylene Powder

| Through | | Retained | | Percent | Cumulative percent |
|---|---|---|---|---|---|
| Mesh No. | Size openings, inch | Mesh No. | Size openings, inch | | |
| | | 20 | .0331 | 0 | 0 |
| 20 | .0331 | 40 | .0165 | 0.8 | 0.8 |
| 40 | .0165 | 60 | .0098 | 5.8 | 6.6 |
| 60 | .0098 | 80 | .0070 | 11.0 | 17.6 |
| 80 | .0070 | 100 | .0059 | 6.8 | 24.4 |
| 100 | .0059 | 200 | .0029 | 56.6 | 81.0 |
| 200 | .0029 | | | 18.8 | 99.8 |

Temperatures at which the sintering is carried out will vary somewhat with the time of exposure, the volume and temperature of the inert gas used, whether or not solvating agents or other additives are used and the degree of porosity desired, etc. In general, the temperature should be above the fusion point of the polyethylene particles, i.e. above about 275° F. if no solvating agent is used; and preferably between about 350° F. and about 450° F. If solvating agents are employed, somewhat lower temperatures may be used because of fusion point lowering of the polyethylene by the solvating agent. Percentage of voids within the limits indicated may be controlled by regulating the temperature and time of sintering, higher temperatures and longer times at the higher temperatures tending to decrease somewhat the percentages of voids while increasing the strength properties due to greater fusion of the mass.

Flow of inert gas through the mass of polyethylene powder will vary somewhat depending on the final porosity desired, the nature of the support, the temperature employed, the depth of the layer, presence or absence of a solvating agent, etc. The flow rate should be low enough not to disrupt or fluidize the mass of polyethylene, and this is particularly important in the initial stages of the sintering operation prior to fusion and formation of a cohesive mat. Flow should be great enough, however, to maintain intercommunicating pores or voids throughout the sheet. If a flexible support such as cloth or paper is used, the rate of gas flow should be slow enough not to unduly disrupt the support. In general, gas flow rates of at least about 150 cubic centimeters per minute per square inch of cross-sectional area should be used and rates between about 300 and about 600 cc. per minute per square inch are preferred.

Time of treatment with hot gas will vary with the temperature of the gas and oven, the flow rate and the final porosity desired. At any particular constant temperature and gas flow rate, the progress of the sintering operation can conveniently be measured by noting the pressure drop in the treating gas as it passes through the polyethylene mass under treatment. This pressure differential tends to build up to a maximum as the particles progressively fuse together, then levels off for a short time, and thereafter starts to decrease. The point of maximum pressure drop may be taken roughly as an indication of the point of optimum characteristics, that is, of maximum strength for the maximum porosity obtainable under the treating conditions used. Thus a simple log of pressure drop through the polyethylene being sintered shows the optimum time for terminating the treatment.

Thus, we prefer to continue heating and gas blowing of the powdered polyethylene for a time sufficient to develop the maximum pressure drop of gas through the sample. In general, treatment times at sintering temperatures of between about 5 minutes and about 45 minutes are satisfactory.

The temperature of the gas or vapors used may vary, but preferably, the gases should be preheated to the vicinity of the sintering temperature for best results.

The resulting porous sheets have high porosity and high strength characteristics rendering them useful as gas filters and in other applications where these characteristics are needed. In general, porosity will be such that the sheet or shape contains at least about 40% of intercommunicating voids, usually between about 45% and about 60%. Strength characteristics are such that burst values as measured on a standard Mullen tester are at least about 60 lbs./sq. in., preferably between about 70 and about 200 p.s.i., while tear values as measured on a standard Elmendorf tester are at least about 0.4 lb., preferably between about 0.5 lb. and about 0.8 lb., when such tests are carried out on porous polyethylene sheets of 0.1 inch thickness. When the finished porous product is to be used for purposes such as gas filters and the like, it is desirable that pressure drop through the mass be at a minimum consistent with other desirable properties. This requirement may vary for different uses but usually will be equivalent to not more than about 20 millimeters of water, preferably between about 0.5 and about 15 millimeters of water, for sheets 0.1 in. thick, at a gas flow rate of 5 liters per minute through a 2.3 inch diameter sample.

Either stiff or flexible sheets may be obtained, depending on other factors, this characteristic varying especially with degree of porosity and average pore size. Stiffness values usually range between about 4,000 and about 7,000 p.s.i. as measured by a Taber stiffness tester on sheets of 0.1 inch thickness, but sheets with higher or lower values than the above may be obtained by variations in the reaction conditions.

The following specific examples further illustrate our invention.

EXAMPLES 1–5

A series of six porous polyethylene sheets was prepared by placing between porous upper and lower supporting members a layer, about .25 inch thick, of powdered polyethylene having a density of about 0.94 and average molecular weight of about 1,560,000 and particle size distribution similar to that shown in Table II above. In Example 1, the porous supports consisted of filter paper backed by wire gauze. In Examples 2–5 the porous supports consisted of sintered steel discs 4 inches in diameter by 1/8 inch thick. The sandwiched layer of polyethylene powder and its supports were clamped between a set of flanges 2.3 inches in inside diameter to which a copper inlet for nitrogen was led.

The sample assembly was placed in an electric oven which had been preheated to the sintering temperature in Example 1, and subsequently heated in Examples 2–5. Nitrogen gas, preheated to the sintering temperature, was passed through support and sample in the heated oven. After sintering, Example 1 and its support were removed from the oven while still hot, and separated from the support after cooling. Examples 2–5 were allowed to cool in the oven while continuing the flow of nitrogen at reduced temperature and were thereafter removed from the support. Also included as controls A, B and C are tests made with powdered polyethylene of the same character and by a similar sintering process except that no top support was provided and blowing with inert gas was omitted.

Sintering conditions and physical properties of the resulting porous sheets are shown in Table III below.

TABLE III

| Example No. | Nitrogen [1] flow rate, cc./min. | Maximum oven temp., °F. | Time at max. temp., minutes | Mm. water pressure drop across sample and support at finish | Properties of finished sheets [2] | | | | | |
|---|---|---|---|---|---|---|---|---|---|---|
| | | | | | Stiffness, p.s.i. | Mullen burst, p.s.i. | Elmendorf tear, lbs. | Pressure drop,[3] mm. water | Apparent density | Percent intercommunicating voids |
| 1 | 1,500 | 400 | 20 | 40 | 4,350 | 77 | 0.48 | 5 | 0.44 | 52 |
| 2 | 1,500 | 395 | 30 | 23 | 7,000 | 110 | 0.70 | 17 | .48 | 50 |
| 3 | 1,500 | 375 | 25 | 25 | 4,500 | 85 | 0.5 | 7 | .44 | 52 |
| 4 | 1,500 | 385 | 25 | 25 | 6,000 | 100 | 0.7 | 12 | .46 | 50 |
| 5 | 1,500 | 400 | 30 | 24 | 5,000 | 185 | 0.8 | 18 | .49 | 50 |
| Control A | None | 400 | ca. 5 | | 3,430 | 32 | 0.19 | 11.8 | .46 | 66.8 |
| Control B | None | 400 | 5 | | 750 | 9 | 0.14 | 1.6 | .31 | 66.8 |
| Control C | None | 400 | 5 | | 14,000 | ca. 50 | 0.51 | 51.5 | .58 | 32.3 |

[1] Through 2.3" diameter sample.
[2] Corrected for sheets of 0.1 in. thickness
[3] At a flow rate of 5 liters per minute through 2.3" diameter sample.

The control tests A, B and C shown in Table III were all produced under similar sintering conditions, and as produced had the properties given for control B, i.e. a high percentage of intercommunicating voids (66.8%) but had strength values in terms of burst and tear of unacceptably low values, e.g. about 9 Mullen and 0.14 Elmendorf. When the B sample was compacted after sintering to an apparent density of .46 in an attempt to improve its strength characteristics and still produce an acceptably high porosity in terms of intercommunicating voids of about 50% (control A), burst and tear values, although increased, still remained unacceptably low, particularly as compared to those of our products. Thus the burst strengths of our sintered products of similar porosity are at least about twice as great, and up to about six times as great as those made by compacting a sheet prepared by prior art sintering technique without inert gas treatment. Tear strengths of our sheets are at least twice as great and up to four times as great as those of the conventionally prepared sintered sheets of similar porosity. When conventionally prepared sintered polyethylene sheets are even further compacted, e.g. to an apparent density of 0.58 (control C) the strength characteristics are raised still further, but the percent intercommunicating voids drops to an unacceptably low figure (32.3%). Our sintered polyethylene compositions, on the other hand, require no compacting after completion of the sintering operation and have the strength and porosity properties indicated immediately upon completion of the sintering operation.

EXAMPLES 6-8

A series of 3 tests was carried out to illustrate the effect of particle size of the polyethylene powder on the strength of the resultant porous sintered polytheylene sheets. In carrying out these tests, powders of polyethylene having the characteristics described in Examples 1-5 above were placed in circular layers of .030 inch thickness and 2.3 inches diameter between rigid supports of sintered steel and the supports and polyethylene placed in an oven maintained between about 375° F. and about 400° F. A stream of nitrogen at about 400° F. was blown through each sample at a rate of 1400 cc. per minute, i.e. about 400 cc. per square inch of cross section, for a period of 45 minutes. Characteristics of the resulting sintered sheets are shown in Table IV below.

TABLE IV

*Effect of Particle Size on Strength of Sintered Polyethylene Sheets*

| Example No. | Particle size (mesh) | Percent voids | Stiffness,[a] p.s.i. | Burst,[a] lbs./in.[2] | Tear,[a] lbs. |
|---|---|---|---|---|---|
| 6 | 40-60 | 56 | 3,950 | 26 | .27 |
| 7 | 100-200 | 52 | 4,350 | 83 | .72 |
| 8 | [b] 60-200 | 49 | 6,500 | 77 | .48 |

[a] Values adjusted to sheets of 0.1 inch thickness.
[b] 50% through 100.

Table IV above illustrates importance of the presence of fines on the strength of the resulting sheets; that made solely of particles passing through 100 mesh and retained on 200 mesh (Example 7) exhibiting the highest burst and tear values of all the fractions tested.

While the above describes the preferred embodiments of our invention, it will be understood that departures may be made therefrom within the scope of the specification and claims.

We claim:
1. A process for preparing porous articles having high porosity and strength characteristics, which comprises confining within a porous support, a mass of pulverulent polyethylene having particle size such that the major portion of the particles pass a standard 40 mesh U.S. screen and are retained on a standard 200 mesh U.S. screen, said polyethylene having a density of at least about 0.935 and average molecular weight between about 1,000,000 and about 5,000,000 subjecting such mass to a temperature between about 300° F. and about 500° F. while concomitantly passing through said mass a stream of gas at a rate of at least about 150 cubic centimeters per minute per square inch of cross section for a time sufficient to sinter the particles and leave a cohesive polyethylene product having at least about 40% of intercommunicating voids, and thereafter cooling the resulting sintered polyethylene product.

2. The process according to claim 1 wherein the gas is an inert gas.

3. The process according to claim 1 wherein the gas is a mixture of inert gas and the vapor of a solvating liquid.

References Cited in the file of this patent

UNITED STATES PATENTS 2,297,248   Rudolph _____ Sept. 29, 1942

FOREIGN PATENTS 777,187   Great Britain _____ June 19, 1957